United States Patent
Lee

(10) Patent No.: US 9,233,712 B2
(45) Date of Patent: Jan. 12, 2016

(54) PARKING GUIDANCE METHOD FOR VEHICLE USING AROUND VIEW MONITOR

(71) Applicant: Hyundai Mobis Co., Ltd., Seoul (KR)

(72) Inventor: Sung Joo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 116 days.

(21) Appl. No.: 13/963,003

(22) Filed: Aug. 9, 2013

(65) Prior Publication Data

US 2014/0333455 A1 Nov. 13, 2014

(30) Foreign Application Priority Data

May 7, 2013 (KR) .......................... 10-2013-0050998

(51) Int. Cl.
*G06F 17/10* (2006.01)
*B62D 15/02* (2006.01)

(52) U.S. Cl.
CPC ............ *B62D 15/027* (2013.01); *B62D 15/028* (2013.01)

(58) Field of Classification Search
CPC ............................ B62D 15/027; B62D 15/028
See application file for complete search history.

(56) References Cited

U.S. PATENT DOCUMENTS

| | | | |
|---|---|---|---|
| 6,611,744 B1* | 8/2003 | Shimazaki et al. | 701/41 |
| 2003/0030724 A1* | 2/2003 | Okamoto | 348/148 |
| 2004/0153243 A1* | 8/2004 | Shimazaki et al. | 701/300 |
| 2011/0102196 A1* | 5/2011 | Kadowaki et al. | 340/932.2 |
| 2014/0085474 A1* | 3/2014 | Lee | 348/148 |

* cited by examiner

*Primary Examiner* — Van Trieu
(74) *Attorney, Agent, or Firm* — NSIP Law

(57) ABSTRACT

There is provided a parking guidance method for a vehicle, of displaying a guidance line for guidance of perpendicular, parallel parking in an AVM synthetic image to provide parking guidance. The method includes entering a parking support mode, displaying parking type information in the parking support mode to select a parking type, displaying a parking reference region or a parking reference line with regard to a parking target space in which the vehicle is to be parked depending on the parking type, displaying a parking alignment reference line when the vehicle travels at a relatively low speed and a steering angle thereof is changed by a threshold value or more, and guiding the vehicle to be aligned such that the parking alignment reference line coincides with a parking section line based on the parking reference region or the parking reference line.

16 Claims, 17 Drawing Sheets

PARKING GUIDANCE METHOD FOR VEHICLE USING AROUND VIEW MONITOR

CROSS-REFERENCE TO RELATED APPLICATION

This application claims priority from Korean Patent Application No. 10-2013-0050998, filed on May 7, 2013 in the Korean Intellectual Property Office, the disclosure of which is incorporated herein by reference in its entirety.

BACKGROUND OF THE INVENTION

1. Field of the Invention

The present invention relates to a parking guidance method, and more particularly, to a method of displaying a guidance line for guidance of perpendicular, parallel parking in an AVM synthetic image to provide parking guidance.

2. Description of the Related Art

An 'around view monitor (AVM)' uses a scheme of providing view images as viewed from above the vehicle to a driver in real time. Such a system includes respective one wide angle camera mounted below the front, back, left and right side-view mirrors of a vehicle such that 360 degrees around a vehicle without a dead angle may be covered and a more stabilized parking operation may be carried out avoiding an obstacle at a dead angle. Further, since the system works both in the cases of traveling forward and traveling backward at a relatively low speed, the parking may be easy even at the time of head-on parking.

Meanwhile, in some cases of parking assistant systems according to the related art, a guidance line is displayed on a screen to support a manipulation of driving. For example, in some cases of parking assistant systems, a guidance line, parallel to a line contacting an expected outer trajectory P1 of a vehicle at the time of reverse turning of a vehicle and simultaneously spaced apart therefrom by a predetermined distance, is displayed to be superimposed on a screen. In this case, a driver may confirm whether a collision with other vehicles (vehicles parked at a parking space within an outer radius of turning of a vehicle) occurs, or the like, while reverse turning, through a guidance line displayed on a screen. However, in the case of displaying an expected outer trajectory P1 of turning of vehicle on an around view monitor (AVM) screen in the scheme as described above, a guidance line may not be appropriately displayed thereon due to a limitation in a view amount on the AVM screen that displays surrounding information of a vehicle in 360 degrees around the vehicle on a single screen. Further, a problem in which a driver cannot intuitionally and easily determine whether an extent of matching between a guidance line and a parking section line is precise may occur.

SUMMARY OF THE INVENTION

An aspect of the present invention provides a parking guidance scheme using an inner-side line rather than using an outer-side line.

According to an aspect of the present invention, there is provided a parking guidance method using an around view monitor (AVM), including: entering a parking support mode; displaying parking type information in the parking support mode to select a parking type; displaying a parking reference region or a parking reference line with regard to a parking target space in which a vehicle is to be parked depending on the parking type; displaying a parking alignment reference line when the vehicle travels at a relatively low speed and a steering angle thereof is changed by a threshold value or more; and guiding the vehicle to be aligned such that the parking alignment reference line coincides with a parking section line based on the parking reference region or the parking reference line.

According to another aspect of the present invention, there is provided a parking guidance method for a vehicle, using an AVM, the method including: displaying at least one or more of a parking reference region and a parking reference line to be superimposed on a top view image; guiding the vehicle to be disposed at an initial position through the parking reference region or the parking reference line; guiding a driver to turn a steering wheel of the vehicle to a predetermined angle in a first direction when the vehicle is disposed at the initial position; displaying a parking alignment reference line to be superimposed on the top view image, the parking alignment reference line being set based on an expected inner trajectory of turning of vehicle when the steering wheel is turned to a predetermined angle in a second direction opposite to the first direction and the vehicle is back turning; guiding the vehicle to be disposed at a reverse position by aligning the parking alignment line with a parking section line; and guiding the driver to turn the steering wheel of the vehicle to a predetermined angle in the second direction when the vehicle is disposed at the reverse position.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
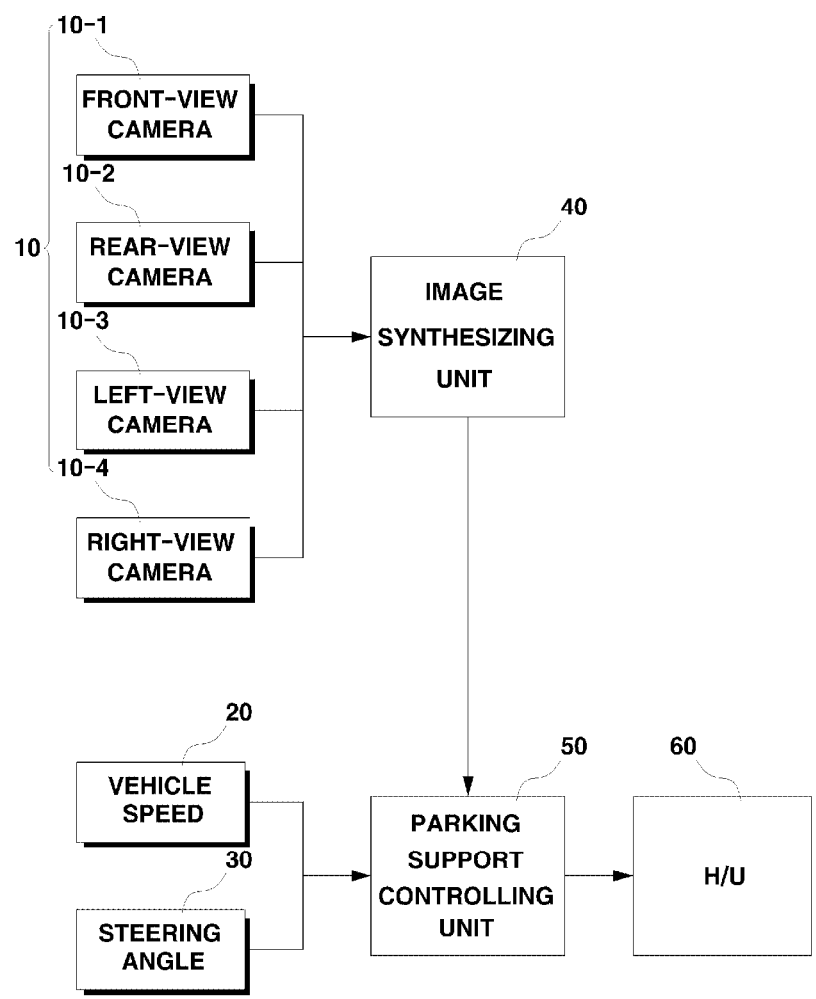
FIG. 1 is a block diagram of a parking guidance system using an AVM according to an embodiment of the present invention.

Embodiments of the present invention will now be described in detail with reference to the accompanying drawings.

The present invention should not be seen as being limited to the embodiments set forth herein and the embodiments herein may be used to assist in understanding the technical idea of the present invention. Like reference numerals designate like components having substantially the same constitution and function in the drawings of the present invention.

FIG. 1 is a block diagram of a parking guidance system using an AVM according to an embodiment of the present invention.

With reference to FIG. 1, a parking guidance system using an around view monitoring system (AVM) (hereinafter, referred to as a 'parking guidance system 1') may include an image acquiring unit 10 acquiring a captured image around a vehicle.

The image acquiring unit 10 may include a plurality of cameras 10-1 to 10-4. For example, the image acquiring unit 10 may include a front-view camera 10-1, a rear-view camera 10-2, a left-view camera 10-3 and a right-view camera 10-4. The front and rear-view cameras 10-1 and 10-2 and the left and right-view cameras 10-3 and 10-4 may respectively take images of view forward and rear of a vehicle and in the left and right of the vehicle, and may provide the photographed images to an image synthesizing unit 40 to be described below. Meanwhile, the parking guidance system 1 according to the embodiment of the present invention may include the image synthesizing unit 40 synthesizing acquired images.

The image synthesizing unit 40 may receive captured view images acquired by the image acquiring unit 10 around a vehicle. For example, the image synthesizing unit 40 may receive, from the front, rear, left and right-view cameras, view images respectively captured by the front and rear-view cameras 10-1 and 10-2 and the left and right-view cameras 10-3 and 10-4 in the front, rear (back), left and right of the vehicle.

The image synthesizing unit 40 may synthesize the received images to generate a top view image. For example, the image synthesizing unit 40 may synthesize view images provided by capturing the surroundings of a provided vehicle to provide a top view image thereof in the form as shown in the right of FIGS. 3A to 4F. Such a top view image may allow a driver of a vehicle to grasp the front, rear, left and right sides of the vehicle at a glance.

The description of the synthesis of top view images as describe above has been publicly known through an around view monitoring system (AVM) according to the related art, and therefore, a detailed description thereof will be omitted.

Meanwhile, the parking guidance system 1 according to the present embodiment may include a parking support controlling unit 50 for guiding a driver to manipulate a steering wheel of a vehicle when parking the vehicle.

The parking support controlling unit 50 may calculate a parking reference region for assisting a driver of the vehicle when driving the vehicle, manipulating a steering wheel, (FIG. 3B), a parking reference line (FIG. 4B), a parking alignment reference line (FIGS. 3C and 4C), and the like. The calculated parking reference region, parking reference line, parking alignment reference line or the like may be displayed to be superimposed on the top-view image in an on-screen display (OSD) scheme.

The parking reference region, parking reference line, parking alignment reference line, and the like will be described in detail with reference to FIGS. 3A to 4F to be described below.

On the other hand, the parking guidance system 1 according to the present embodiment may include a head unit (H/U) 60.

The head unit 60 may display the parking reference region, the parking reference line, the parking alignment reference line, and the like, superimposed on each other. In addition, the head unit 60 may transmit user option information selected by a driver to the parking support controlling unit 50.

That is, when a vehicle travels at a relatively low speed and a button input operation is applied to a parking support button by a driver, the head unit 60 may enter a parking support mode in which a guidance line for parking guidance and message information related thereto are displayed. Further, the head unit 60 may display a menu for selecting a parking option (a parking type) such as perpendicular parking (left), perpendicular parking (right), parallel parking (left), parallel parking (right), or the like, such that a driver of a vehicle may select a parking type using the parking support mode.

The head unit 60 may display a guidance message for positioning the parking reference region or the parking reference line in the parking space for parking of a vehicle depending on the selected parking type, and the driver may drive a vehicle forward or backward according to a guidance message.

For example, when the parking type is perpendicular parking, the parking reference region may be displayed, and the head unit 60 may display a guidance message guiding the parking reference region to be positioned on the center part of a parking space according to the guidance message. In addition, when the parking type is parallel parking, the parking reference line may be displayed, and the head unit 60 may display a guidance message the parking reference line to be matched with a parking section line.

Further, the head unit 60 may display a parking alignment reference line when a vehicle travels at a relatively low speed in a parking support mode and a steering angle thereof is changed to have a threshold value or more.

For example, when the parking type is perpendicular parking, the parking reference region and the parking alignment reference line may be displayed in a single direction. Here, the head unit 60 may display a guidance message a vehicle to travel forward until the parking alignment reference line coincides with a parking section line of the parking space according to the guidance message and then stop.

As another example, when the parking type is parallel parking, the parking reference line may be displayed in the front side of the parking section line in a 'T' form to be mapped with the parking section line of the parking space, and the parking alignment reference line may be displayed in a direction opposite to the parking reference line, based on the vehicle. At this time, the head unit 60 may display a message guiding the vehicle to travel backward until the parking alignment reference line coincides with the parking section line and then stop.

Meanwhile, when a steering wheel of the vehicle is in neutral, the parking guidance as described above may be completed.

Alternatively, when a vehicle speed exceeds a threshold value, a shift lever is in the P gear position, or a button input operation is applied to a parking completion button, the parking guidance as described above may be forcibly completed.

Figure 2:
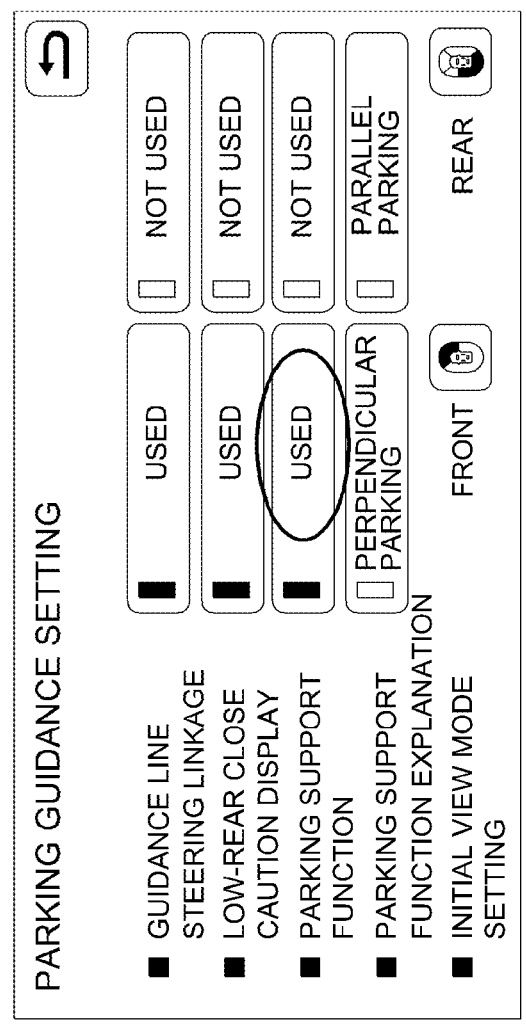
FIG. 2 illustrates examples of user options of a head unit according to an embodiment of the present invention.

FIG. 2 illustrates examples of user options of the head unit according to an embodiment of the present invention.

A parking guidance mode entrance may be activated when the parking guidance options of the head unit are turned as shown in FIG. 2 at the time of traveling at a relatively low speed, and may be inactivated at the time of traveling at a relatively high speed.

FIGS. 3A to 3G illustrate parking guidance interfaces of a perpendicular parking mode according to an embodiment of the present invention.

Figure 3A:
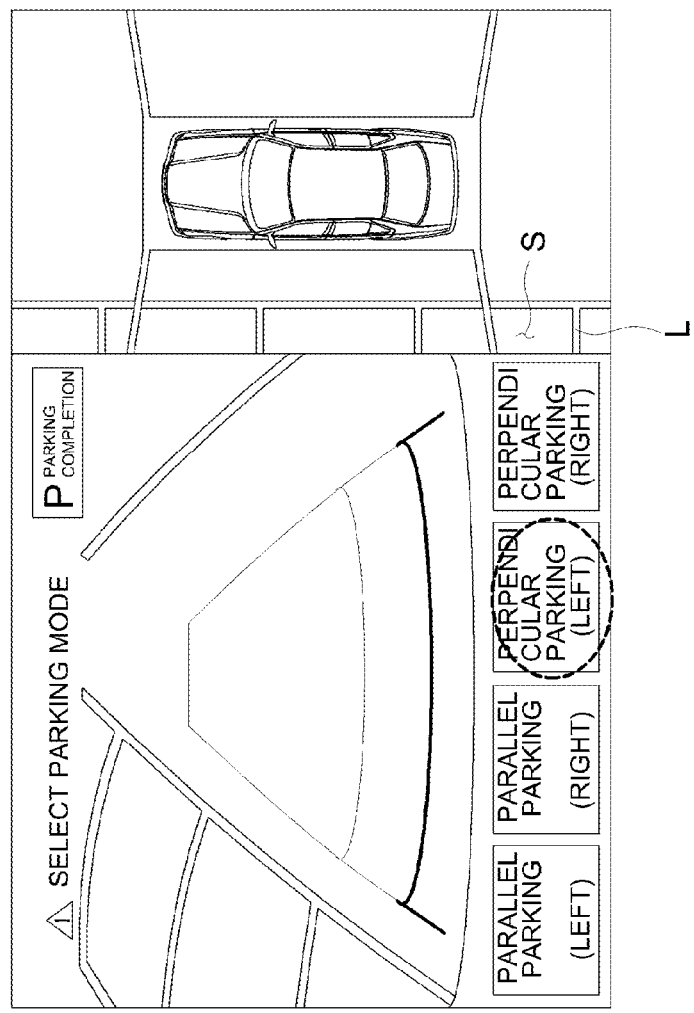
FIGS. 3A to 3G illustrate parking guidance interfaces of a perpendicular parking mode according to an embodiment of the present invention.

FIG. 3A illustrates a head unit for selecting a perpendicular parking mode after a button input operation is applied to a parking guidance button.

With reference to FIG. 3A, in the case of the parking guidance mode, any one of four options such as parallel parking (left), parallel parking (right), perpendicular parking (left) and perpendicular parking (right) may be selected.

Figure 3B:
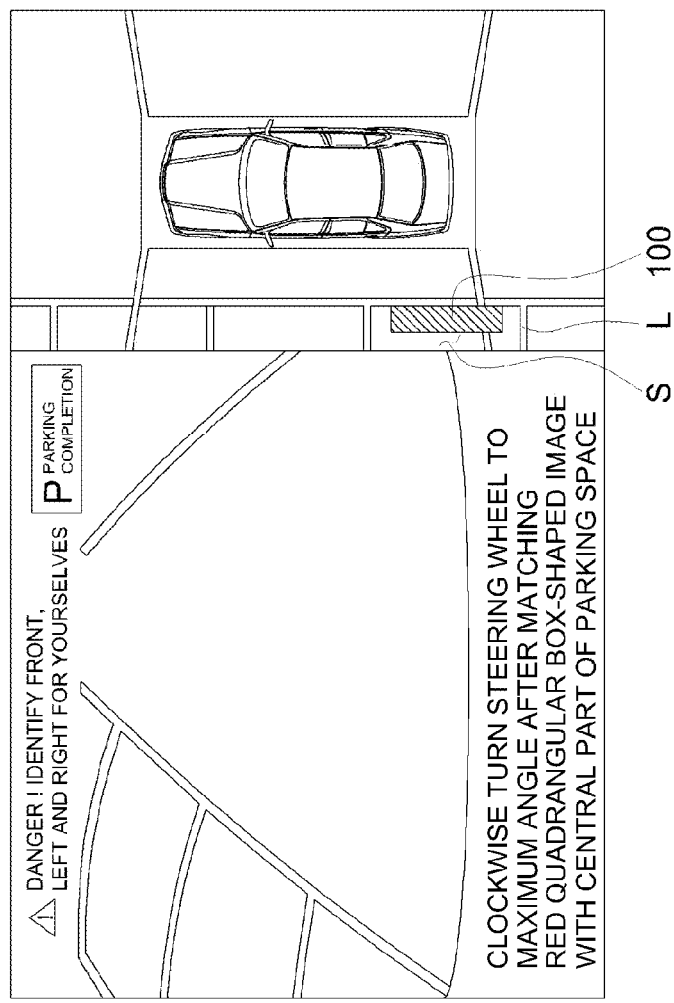

FIG. 3B illustrates the head unit for aligning an initial stop position in a perpendicular parking mode.

With reference to FIG. 3B, a parking reference region 100 may be displayed on an around view monitor. For example, the parking reference region 100 may be represented as a red quadrangular box-shaped image on the monitor. Here, the parking mode selection button image may disappear, and a guidance message "Clockwise turn the steering wheel of the vehicle to the maximum angle after matching the red quadrangular-box shaped image with a central part of a parking space for vehicle parking" may be displayed in the head unit. The driver may move the vehicle depending on the guidance message such that the parking reference region 100 is aligned with the center part of a parking target space S displayed on the around view monitor.

Figure 3C:
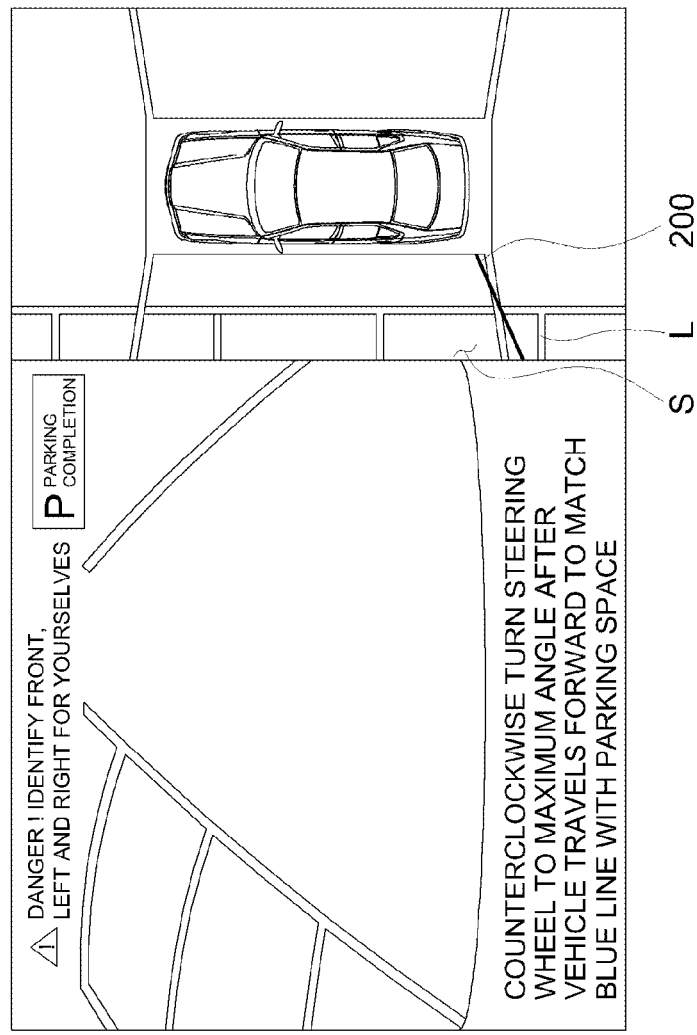

FIG. 3C illustrates a head unit displaying a guidance message changed according to sensing of the change in a steering angle after aligning at an initial stop position in the perpendicular parking mode.

Referring to FIG. 3C, the driver may move the vehicle to be initially aligned, with reference to the parking reference region 100, and may then clockwise turn the steering wheel of the vehicle to the maximum angle. In this case, when the vehicle travels a relatively low speed and a steering angle thereof has a threshold value or more, the parking alignment reference line 200 may be displayed on the around view monitor. For example, the parking alignment reference line 200 may be represented as a blue line on the monitor screen. At this time, the red parking reference region 100 may be displayed in the head unit or may also be deleted.

In addition, a guidance message "Counterclockwise turn the steering wheel to the maximum angle after the driver moves the vehicle forwards such that the parking alignment reference line is matched with the parking space image" may be displayed in the head unit. According to the guidance message, the driver may move the vehicle forwards such that the parking alignment reference line 200 may be aligned with one side parking section line L of the parking target space S.

In this case, the parking alignment line 200 may be positioned in the same direction as that of the parking reference region 100, and may be positioned in the rear of the parking reference region 100. Alternatively, based on the vehicle, in the case of the perpendicular parking (left), the parking alignment reference line 200 may be displayed to be disposed in the rear of the left of the vehicle.

Figure 3D:
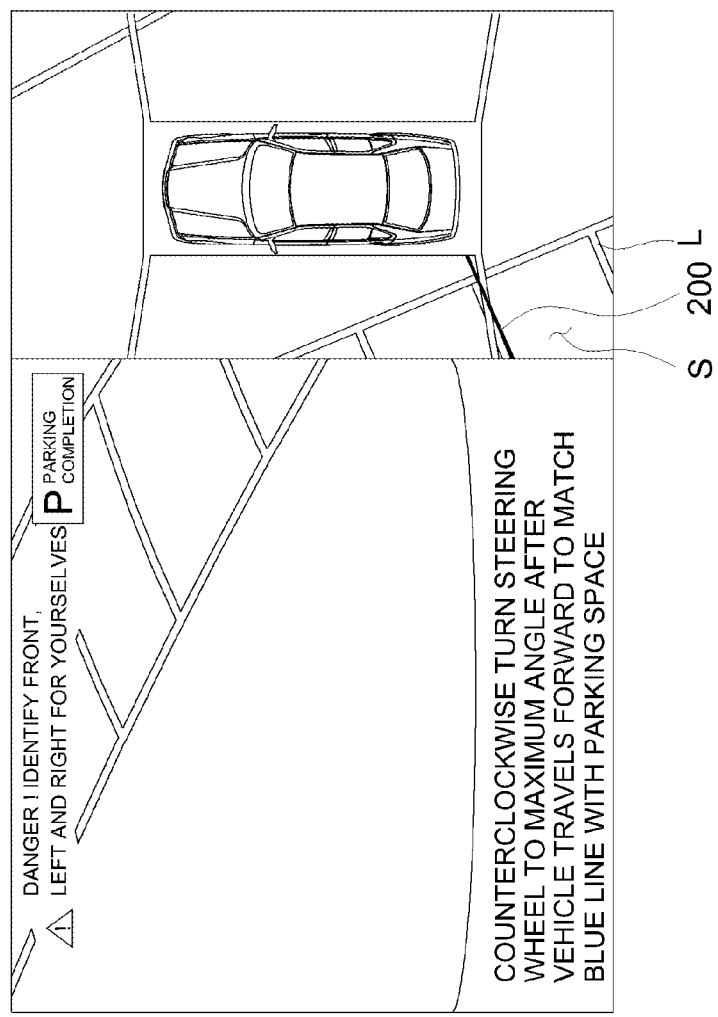

FIG. 3D illustrates a head unit for matching the parking alignment reference line with a parking space in the perpendicular parking mode.

With reference to FIG. 3D, the guidance message represented in FIG. 3C may be continuously displayed such that the vehicle travels forward and then stops according the guidance message until the parking alignment line 200 coincides with the parking section line L. In addition, contents relating to the status in which the vehicle travels forward until the parking alignment reference line 200 coincides with the parking section line L, the coincidence between the parking alignment reference line 200 and the parking section line, and the like, may be continuously updated and displayed.

Figure 3E:
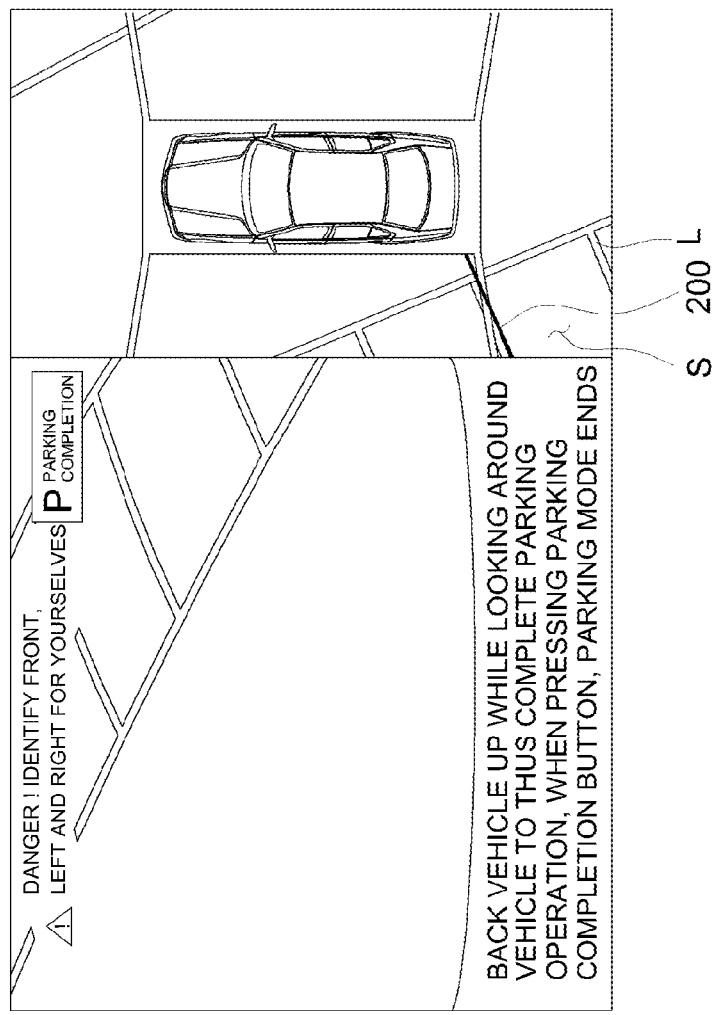

FIG. 3E illustrates a head unit displaying a guidance message changed according to sensing of the change in a steering angle after matching with the parking alignment reference line in the perpendicular parking mode.

Referring to FIG. 3E, after matching with the parking alignment reference line 200 in FIG. 3D, the driver may counterclockwise turn the steering wheel of the vehicle to the maximum angle. In this case, when the vehicle travels at a relatively low speed and a steering angle thereof has a threshold value or more, a guidance message "Back the vehicle up while looking around the vehicle to thus complete the parking operation. When pressing the parking completion button, the parking mode ends" may be displayed in the head unit. The driver may back the vehicle up to thus park the corresponding vehicle while counterclockwise turning the steering wheel of the vehicle to the maximum angle according to the guidance message displayed when the vehicle travels at a relatively low speed and a steering angle thereof has a threshold value or more.

Figure 3F:
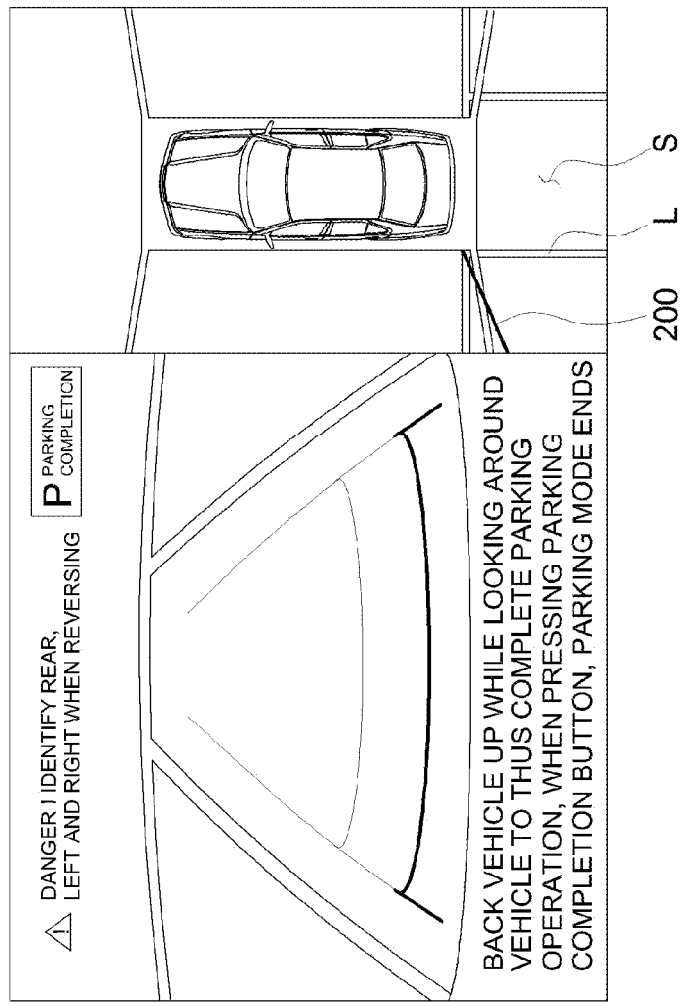

FIG. 3F illustrates a head unit displaying a screen image such that the driver backs the vehicle up until a vehicle mask is aligned with the parking section line and then stops the vehicle in the perpendicular parking mode.

With reference to FIG. 3F, the guidance message "Back the vehicle up while looking around the vehicle to thus complete the parking operation. When pressing the parking completion button, the parking mode ends" may be continuously displayed such that a vehicle mask of the corresponding vehicle may enter a parking section line region, and contents relating to the coincidence between the vehicle mask and the parking section line and the like may be continuously updated and displayed.

Figure 3G:
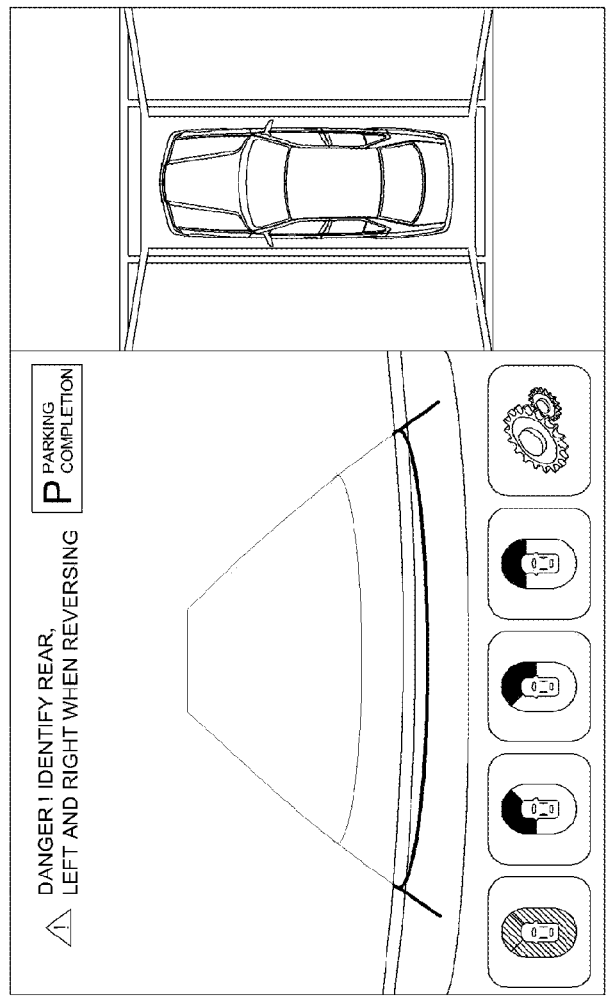

FIG. 3G illustrates a head unit for controlling a space at a back side of a vehicle after the completion of parking.

With reference to FIG. 3G, the steering wheel may be in neutral and the vehicle reverses to thus adjust a space at the back side of the vehicle. When the steering wheel of the vehicle is in neutral, the guidance line displayed on the previous screen may be deleted and the parking guidance may be completed.

In the previous parking support mode, when a vehicle speed exceeds a threshold value, the shift lever is in the P gear position, or a button input operation is applied to the parking completion button, the AVM mode may be completed.

FIGS. 4A to 4F illustrate parking guidance interfaces of a parallel parking mode according to an embodiment of the present invention.

Figure 4A:
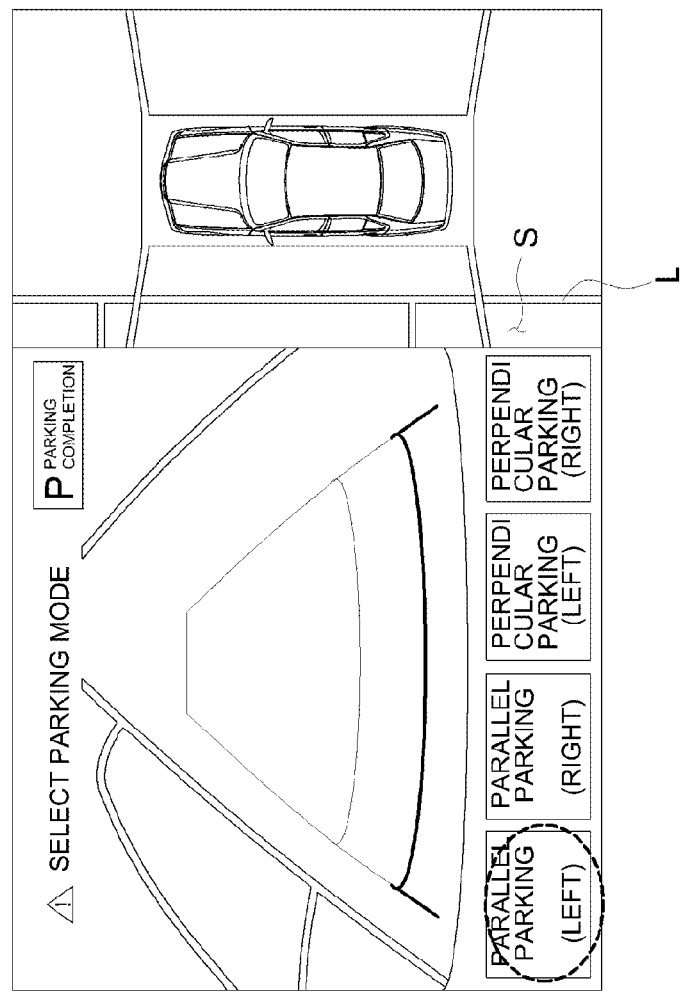
FIGS. 4A to 4F illustrate parking guidance interfaces of a parallel parking mode according to an embodiment of the present invention.

FIG. 4A illustrates a head unit for selecting a parallel parking mode after a button input operation is applied to the parking guidance button.

With reference to FIG. 4A, in the case of the parking guidance mode, any one of four options such as the parallel parking (left), the parallel parking (right), the perpendicular parking (left) and the perpendicular parking (right) may be selected.

Figure 4B:
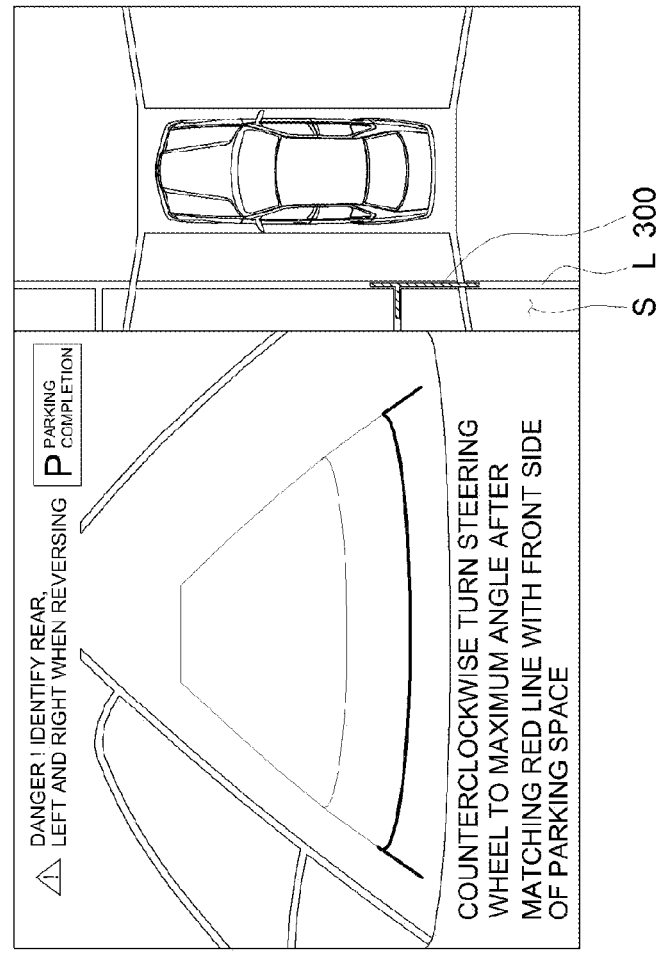

FIG. 4B illustrates the head unit for aligning an initial stop position in a parallel parking mode.

With reference to FIG. 4B, a parking reference line 300 may be displayed on the around view monitor. For example, the parking reference line 300 may be represented as a red line in a 'T' form on the monitor. Here, the parking mode selection button image may disappear, and a guidance message "Counterclockwise turn the steering wheel of the vehicle to the maximum angle after matching the red line with a front side of a parking space for vehicle parking" may be displayed in the head unit.

The driver may move the vehicle depending on the guidance message such that the parking reference line 300 is aligned with the parking section line L of a front side of a parking target space S displayed on the around view monitor.

Figure 4C:
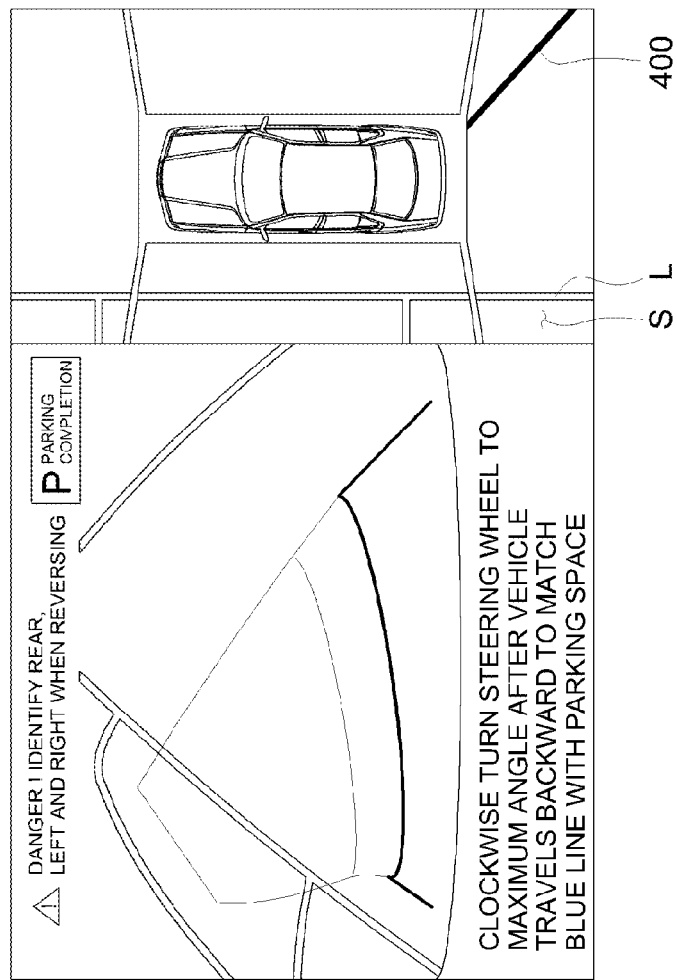

FIG. 4C illustrates a head unit displaying a guidance message changed according to sensing of a change in a steering angle after aligning at an initial stop position in the parallel parking mode.

Referring to FIG. 4C, the driver may move the vehicle to be initially aligned, with reference to the parking reference line 300, and may then counterclockwise turn the steering wheel of the vehicle to the maximum angle. In this case, when the vehicle travels at a relatively low speed and a steering angle thereof has a threshold value or more, a parking alignment reference line 400 may be displayed on the around view monitor. For example, the parking alignment reference line 400 may be represented as a blue line on the monitor screen. At this time, the red parking reference line 300 may be displayed in the head unit or may also be deleted.

In addition, a guidance message "Clockwise turn the steering wheel of the vehicle to the maximum angle after the driver reverses the vehicle such that the parking alignment reference line is matched with the parking space image" may be displayed in the head unit. According to the guidance message, the driver may reverse the vehicle such that the parking alignment reference line 400 may be aligned with one side parking section line L of the parking target space S.

In this case, the parking alignment line 400 may be positioned in a direction opposite to that of the parking reference line 300 and may be positioned in the rear of the parking reference line 300. Alternatively, based on the vehicle, in the case of the parallel parking (left), the parking alignment reference line 400 may be displayed to be disposed in the rear of the right of the vehicle.

Meanwhile, although not shown in FIG. 4, in the case of a 'perpendicular parking (right)' type, the parking of a vehicle may be performed through a manipulation of a steering wheel opposite to those in FIGS. 3A to 3G.

Figure 4D:
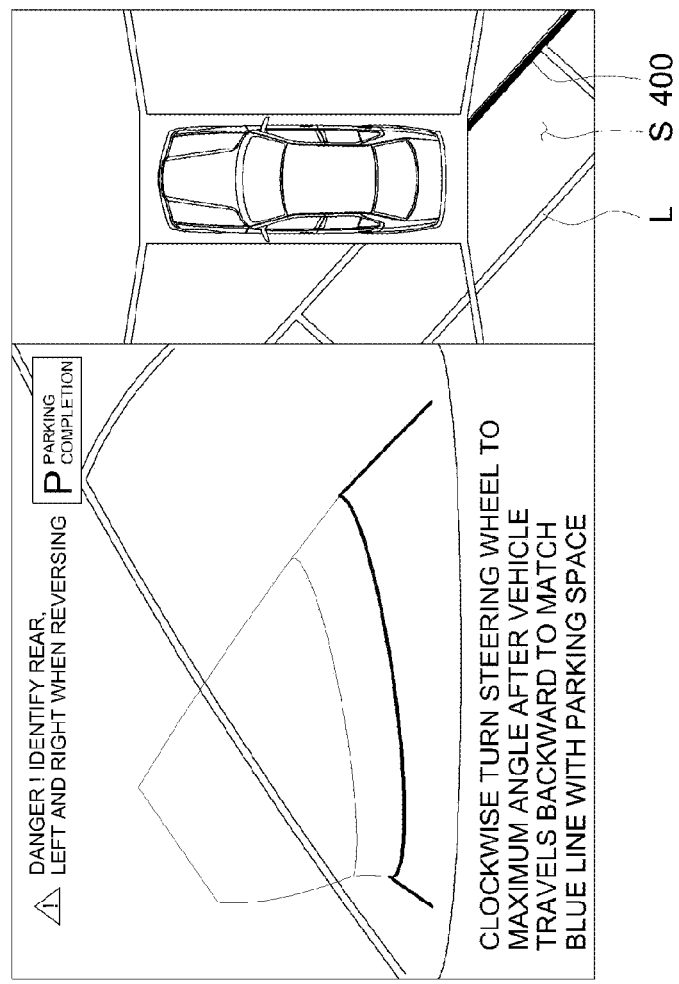

FIG. 4D illustrates a head unit for matching the parking alignment reference line with a parking space in the parallel parking mode.

With reference to FIG. 4D, the guidance message represented in FIG. 4C may be continuously displayed such that the vehicle travels backward and then stops according the guidance message until the parking alignment line 400 coincides with the parking section line L. In addition, contents relating to the status in which the vehicle travels backward until the parking alignment reference line 400 coincides with the parking section line L, the coincidence between the parking alignment reference line 200 and the parking section line L, and the like, may be continuously updated and displayed.

FIG. 3E illustrates a head unit displaying a guidance message changed according to sensing of the change in a steering angle after matching with the parking alignment reference line in the parallel parking mode.

Figure 4E:
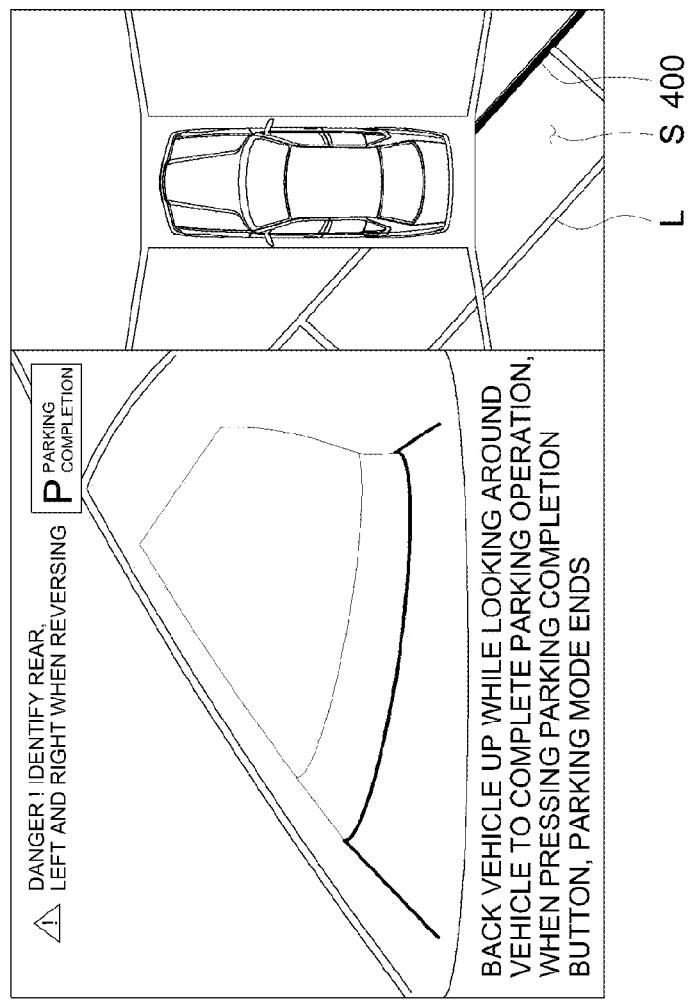

Referring to FIG. 4E, after matching with the parking alignment reference line 400 in FIG. 4D, the driver may clockwise turn the steering wheel of the vehicle to the maximum angle. In this case, when the vehicle travels at a relatively low speed and a steering angle thereof has a threshold value or more, a guidance message "Back the vehicle up while looking around the vehicle to complete the parking operation. When pressing the parking completion button, the parking mode ends" may be displayed in the head unit. The driver may reverse the vehicle to thus park the corresponding vehicle while clockwise turning the steering wheel of the vehicle to the maximum angle according to the guidance message displayed when the vehicle travels at a relatively low speed and a steering angle thereof has a threshold value or more.

Figure 4F:
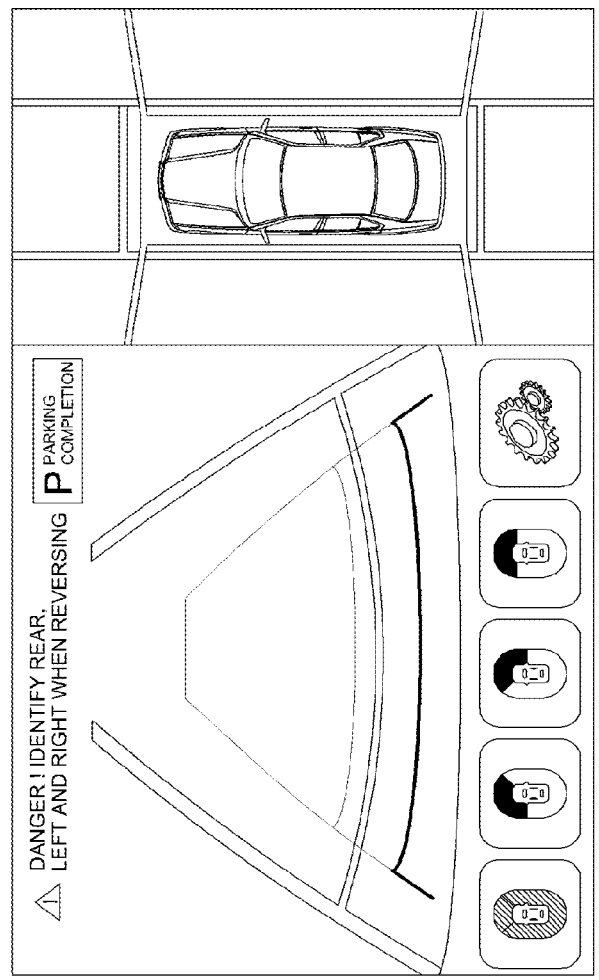

FIG. 4F illustrates a head unit displaying a screen image such that the driver reverses the vehicle until a vehicle mask is aligned with the parking section line and then stops the vehicle in the parallel parking mode.

With reference to FIG. 4F, the guidance message "Back the vehicle up while looking around the vehicle to complete the parking operation. When pressing the parking completion button, the parking mode ends" may be continuously displayed such that a vehicle mask of the corresponding vehicle may enter a parking section line region, and contents relating to the coincidence between the vehicle mask and the parking section line and the like may be continuously updated and displayed.

FIG. 4F illustrates a head unit for adjusting a space around a back side of the vehicle after the completion of parking.

With reference to FIG. 4F, the steering wheel of the vehicle may be in neutral and the vehicle may reverse to thus adjust a space around the back side of the vehicle. When the steering wheel of the vehicle is in neutral, the guidance line displayed on the previous screen may be deleted and the parking guidance may be completed.

In the previous parking support mode, when a vehicle speed exceeds a threshold value, the shift lever enters the P gear position, or a button input operation is applied to the parking completion button, the AVM mode may be completed.

Meanwhile, although not shown in FIG. 4, in the case of a 'parallel parking (right)' type, the parking of the vehicle may be performed through a manipulation of the steering wheel opposite to those in FIGS. 4A to 4F.

Figure 5A:
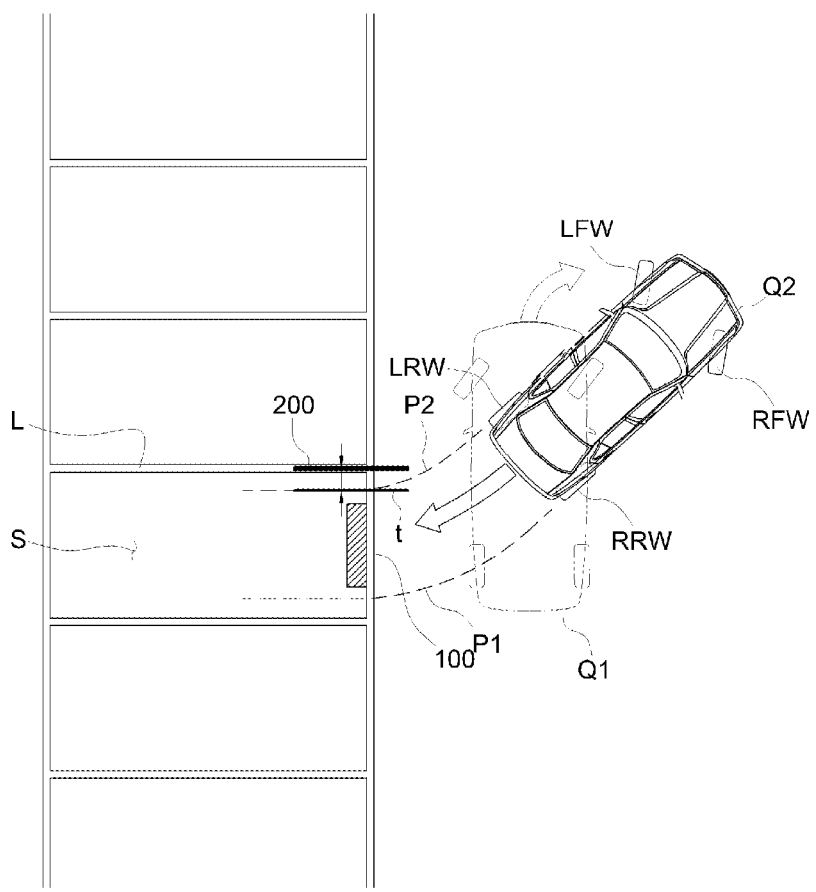
FIGS. 5A and 5B are schematic views illustrating a method of displaying a parking reference line and a parking alignment reference line at the time of a perpendicular parking or a parallel parking.

FIG. 5A is a schematic view illustrating a method of displaying a parking reference region and a parking alignment reference line at the time of a perpendicular parking.

With reference to FIG. 5A, the parking reference region 100 may be displayed at a position spaced apart from the vehicle by a predetermined interval in a lateral direction of the vehicle. For example, in the case of a 'perpendicular parking (left)' type, the parking reference region 100 may be displayed at a position spaced apart from the vehicle by a predetermined interval in a left direction of the vehicle.

Here, the position of the parking reference region 100 may be determined based on the vehicle. For example, the parking reference region 100 may be displayed at a position spaced apart from the vehicle by a predetermined interval in the left direction of the vehicle, based on the lateral direction of the vehicle. Therefore, as the vehicle moves, the parking reference region 100 may also move to correspond to the movement of the vehicle on the monitor screen.

Meanwhile, a distance between the parking reference region 100 and the vehicle may be determined in consideration of an interval required to perform the perpendicular parking of the vehicle in the parking target space S. In other words, the position of the parking reference region 100 may be determined in consideration of an interval between the vehicle for the perpendicular parking and the parking section line L. Thus, when the driver aligns the parking reference region 100 with the parking target space S or the parking section line L, the vehicle may be disposed at an initial position P1 necessary for the parking (See FIG. 3B).

The determination of the parking reference region 100 or the display of the superimposition on the top view image may be performed through the afore-mentioned parking support controlling unit 50 (See FIG. 1).

On the other hand, when the vehicle is disposed at the initial position P1 using the parking reference region 100, the vehicle may be disposed at a reverse position P2 at which the vehicle may reverse to perform the reverse parking (See FIGS. 3C and 3D).

Here, the movement of vehicle from the initial position P1 to the reverse position P2 may be performed as the vehicle travels forward in a state in which the steering wheel of the vehicle is fully turned in a first direction. For example, in the case of the 'perpendicular parking (left)' type, the vehicle travels forward in a state in which the steering wheel is fully turned clockwise such that the vehicle may move from the initial position P1 to the reverse position P2. Information for the manipulation of the steering wheel and the movement of vehicle as described above may be provided to the driver through the guidance message as described with reference to FIGS. 3C and 3D.

In addition, information for the movement of vehicle from the initial position P1 to the reverse position P2 may be provided to the driver through the parking alignment reference line 200. That is, the driver may drive the vehicle to travel forward to a position on which the parking alignment reference line 200 is aligned with the parking section line L, thereby allowing the vehicle to move from the initial position P1 to the reverse position P2.

Here, the parking alignment reference line 200 may be determined based on the state in which the steering wheel is fully turned in the second direction opposite to the first direction. For example, in the case of the 'perpendicular parking (left)' type, the parking alignment reference line 200 may be determined based on a state in which the steering wheel is fully turned counterclockwise.

In addition, in a case in which reverse turning of the vehicle in a state in which the steering wheel is fully turned in the second direction, the parking alignment reference line 200 may be determined and displayed based on an expected inner trajectory P2 of turning of vehicle.

In more detail, at the time of the perpendicular parking, the vehicle may reverse turn to be parked in the parking target space S. In this case, the vehicle movement trajectory may be defined by an inner trajectory P2 of turning of vehicle and an outer trajectory P1 of turning of vehicle. Here, the inner trajectory P2 of turning of vehicle refers to an inner trajectory P2 in a radius direction at the time of reverse-turning movement of the vehicle, and the outer trajectory P1 of turning of vehicle refers to an outer trajectory P1 of turning of vehicle at the time of reverse-turning movement of the vehicle. That is, principally explaining with reference to FIG. 5A, the outer trajectory P1 of turning of vehicle may refer to a trajectory formed by a rear end part of vehicle or a right rear wheel (RRW) of the vehicle, and the inner trajectory P2 of turning of vehicle may refer to a trajectory formed by a left rear end part of the vehicle or a left rear wheel (LRW) of the vehicle.

Meanwhile, in this case, a tangent line (t) may be defined as a line contacting the inner trajectory P2 of turning of vehicle at a point spaced apart from the vehicle in a rear direction thereof by a predetermined distance, and the parking alignment reference line 200 may be set and displayed as a line parallel to the tangent line (t) as described above.

That is, the parking alignment reference line 200 may be set and displayed as a line parallel to the tangent line (t) contacting the inner trajectory P2 of turning of vehicle by calculating an expected inner trajectory P2 of turning of vehicle in a case in which the vehicle turns backward in a state in which the steering wheel of the vehicle is fully turned in the second direction.

In addition, the parking alignment reference line 200 may be set and displayed as a line spaced apart from the tangent line (t) by a predetermined interval. More specifically, the parking alignment reference line 200 may be set and displayed as a line spaced apart from the tangent line (t) by a predetermined interval inwardly in a radial direction thereof.

Meanwhile, the setting of the parking alignment reference line 200 or the display of the superimposition on the top view image may be performed through the afore-mentioned parking support controlling unit 50 (See FIG. 1).

A scheme in which the parking alignment reference line 200 is calculated and displayed based on the inner trajectory P2 of turning of vehicle as described above may allow the parking alignment reference line 200 to be displayed more effectively in an around view monitoring system.

More specifically, in the case of the around view monitoring system, since captured images of the surroundings of the vehicle may be displayed in the manner of a top view, there may be a limitation in a view amount on a monitor screen. Thus, when the guidance line is calculated and displayed based on the outer trajectory P1 of turning, it may be difficult to appropriately display a guidance line due to limitation in terms of a view amount. For example, in the case of 3C, on the assumption that the guidance line is calculated and displayed based on the outer trajectory P1 of turning, a problem in which the guidance line may not be appropriately displayed on the screen may occur.

Meanwhile, according to the present embodiment, the parking alignment reference line 200 may be calculated and displayed based on the inner trajectory P2 of turning such that the problem as described above may be solved. In addition, the parking alignment reference line 200 for parking guidance may be appropriately displayed in the around view monitoring system.

On the other hand, when the vehicle is guided to the reverse position P2 through the parking alignment reference line 200 as described above, the driver may fully turn the steering wheel in the second direction and may turn and back up the vehicle to thus park the vehicle in the parking target space S (See FIGS. 3E to 3G).

As a result, the driver may align the vehicle in the initial position P1 through the parking reference region 100, may move the vehicle to the reverse position P2 through the parking alignment reference line 200 in a state in which the steering wheel is fully turned in the first direction, and then, may fully turn the steering wheel in a direction opposite thereto, the second direction and reverse the vehicle, thereby simply parking the vehicle in the parking target space S.

Figure 5B:
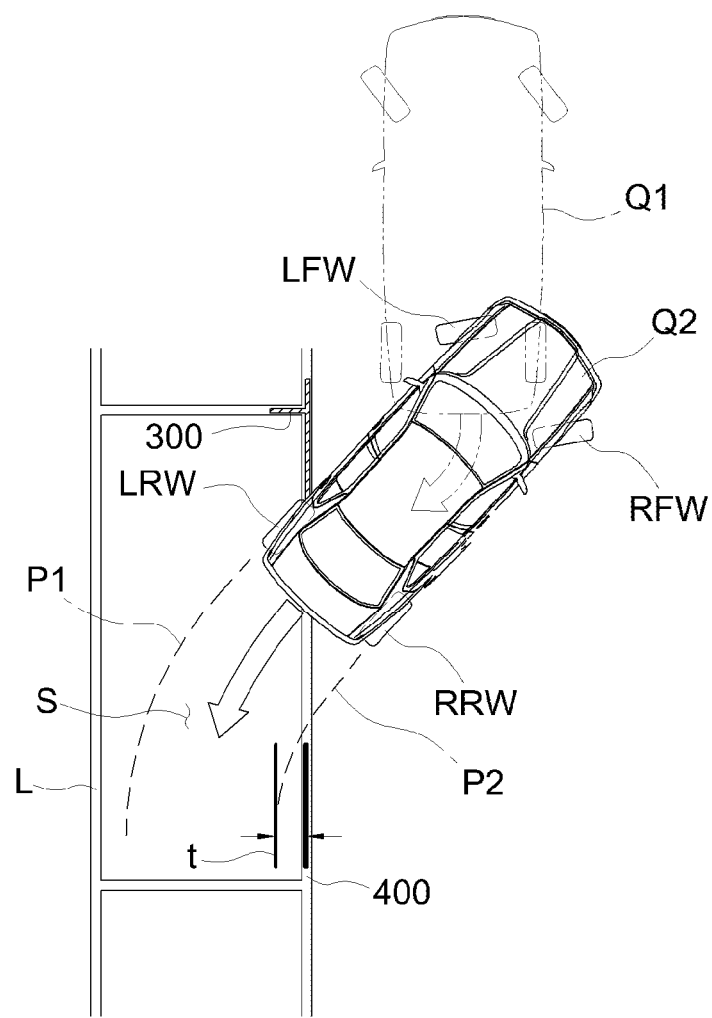

FIG. 5B is a schematic view illustrating a display method of a parking reference line and a parking alignment reference line at the time of parallel parking.

With reference to FIG. 5B, in the case of parallel parking, the parking reference line 300 and the parking alignment reference line 400 may also be set and displayed in a similar manner to the case of the afore-mentioned perpendicular parking. However, in the case of parallel parking, the parallel parking may have a slight difference from the perpendicular parking in that the parking reference line 300 is displayed rather than displaying the parking reference region 100 and the vehicle moves from an initial position P3 to a reverse position P4 through traveling backward rather than traveling forward.

On the other hand, although the present embodiment describes the case in which the parking reference region 100 is determined and displayed at the time of perpendicular parking and the parking reference line 300 is determined and displayed at the time of parallel parking, embodiments thereof may be varied as necessary. For example, even in the case of perpendicular parking, a line form of parking reference line instead of the parking reference region 100 may be determined and displayed, and even in the case of parallel parking, a quadrangular shaped reference region instead of the parking reference line 300 may be determined and displayed.

Further, in the present embodiment, although the case that the steering wheel is fully turned in the first direction or the second direction is mainly described, the parking alignment reference line 200 or 400 or the like may also be set and displayed based on the case of 'a determined steering angle'

As set forth above, according to various embodiments of the present invention, a driver of a vehicle may easily determine whether a degree of matching between a parking section line of a parking space and a vehicle is precise by using a parking reference region or a parking reference line and a parking alignment reference line.

While the inventive concept has been shown and described in connection with embodiments, it will be apparent to those skilled in the art that modifications and variations can be made without departing from the spirit and scope of the present inventive concept as defined by the appended claims.

What is claimed is:

1. A parking guidance method for a vehicle, using an around view monitor (AVM), comprising:
    entering a parking support mode;
    displaying parking type information in the parking support mode to select a parking type;
    displaying, in response to the selected parking type, a parking reference region or a parking reference line respectively corresponding to a parking target space in which the vehicle is to be parked, wherein the parking reference region is aligned with the center part of a parking target space and the parking reference line is aligned with a side of a parking section line of the parking target space;
    displaying a parking alignment reference line when the vehicle travels at a relatively low speed and a steering angle thereof is changed by at least a threshold value; and
    guiding the vehicle to a parked position such that the parking alignment reference line coincides with a parking section line based on the parking reference region or the parking reference line.

2. The method of claim 1, wherein when the parking type is perpendicular parking, the parking reference region is displayed, and the parking reference region and the parking alignment reference line are displayed in a single direction based on the vehicle.

3. The method of claim 2, wherein a message guiding that the parking reference region is to be positioned on the central part of the parking target space is displayed.

4. The method of claim 2, wherein a message guiding the vehicle to travel forward until the parking alignment reference line coincides with the parking section line of the parking target space and then stop is displayed.

5. The method of claim 1, wherein when the parking type is parallel parking, the parking reference line is displayed, and the parking reference line is displayed in a 'T' form to be mapped with the parking section line of the parking target space.

6. The method of claim 5, wherein the parking reference line and the parking alignment reference line are displayed in directions opposite to each other based on the vehicle.

7. The method of claim 5, wherein a message guiding that the parking reference line is to be aligned with the parking section line at a front side of the parking target space is displayed.

8. The method of claim 5, wherein a message guiding the vehicle to reverse until the parking alignment reference line coincides with the parking section line of the parking target space and then stop is displayed.

9. The method of claim 1, wherein when a steering wheel of the vehicle is in a stationary position, a vehicle speed exceeds a threshold value, a shift lever of the vehicle is positioned at a p-gear position, or a parking completion button is actuated, a parking guidance is completed.

10. A parking guidance method for a vehicle, using an around view monitor (AVM), comprising:
    displaying, in response to selection of a parking type, a parking reference region or a parking reference line, respectively corresponding to a parking space in which the vehicle is to be parked, to be superimposed on a top view image, wherein the parking reference region is aligned with the center part of a parking target space and the parking reference line is aligned with a side of a parking section line of the parking target space;
    guiding the vehicle to an initial position based on the parking reference region or the parking reference line;
    guiding a driver of the vehicle to turn a steering wheel thereof to a predetermined angle in a first direction when the vehicle is disposed at the initial position;
    displaying a parking alignment reference line to be superimposed on the top view image, the parking alignment reference line being set based on an expected inner trajectory of turning of the vehicle when the steering wheel is turned to a predetermined angle in a second direction opposite to the first direction and the vehicle is reverse turning;
    guiding the vehicle to a reverse position by aligning the parking alignment reference line with a parking section line based on the parking reference region or the parking reference line; and
    guiding the driver to turn the steering wheel of the vehicle to a predetermined angle in the second direction when the vehicle is disposed at the reverse position.

11. The method of claim 10, further comprising a step of selecting a parking type prior to displaying the parking reference region or the parking reference line, wherein the parking type includes at least one of perpendicular parking (left), perpendicular parking (right), parallel parking (left) and parallel parking (right).

12. The method of claim 11, wherein when the parking type is selected as the perpendicular parking (left) or the perpendicular parking (right), guiding the vehicle to the reference position is performed to guide the vehicle to travel forward in a state in which the steering wheel is turned to the predetermined angle in the first direction such that the parking alignment reference line is aligned with the parking section line.

13. The method of claim 11, wherein when the parking type is selected as the parallel parking (left) or the parallel parking (right), guiding the vehicle to the reverse position is performed to guide the vehicle to travel backward in the state in which the steering wheel is turned to the predetermined angle in the first direction such that the parking alignment reference line is aligned with the parking section line.

14. The method of claim 10, wherein guiding the driver of the vehicle to turn the steering wheel is performed to guide the driver to fully turn the steering wheel of the vehicle in the first direction, and displaying the parking alignment reference line is performed to set and display the parking alignment reference line based on the steering wheel being fully turned in the second direction.

15. The method of claim 10, wherein displaying a parking alignment reference line is performed to calculate a tangent line of an inner trajectory of turning of vehicle at a point spaced apart from the vehicle in a rear direction thereof by a predetermined distance, and the parking alignment reference line is set and displayed as a line parallel to the tangent line.

16. The method of 10, further comprising guiding the vehicle to travel backward in a state in which the steering wheel is turned to the predetermined angle in the second direction so as to be parked in a parking target space, after guiding the driver to turn the steering wheel of the vehicle to the predetermined angle is performed.

* * * * *